United States Patent
Kaneko et al.

(10) Patent No.: US 9,747,956 B1
(45) Date of Patent: Aug. 29, 2017

(54) BASE FOR PROTECTING EXTERNAL WELDS OF HERMETICALLY SEALED ELECTRONIC DEVICES

(71) Applicant: HGST Netherlands B.V., Amsterdam (NL)

(72) Inventors: Jiro Kaneko, Kanagawa (JP); Gantaro Nakamura, Kanagawa (JP); Koichi Suzuki, Kanagawa (JP); Naoshi Mizumoto, Kanagawa (JP); Naoaki Kanada, Kanagawa (JP); Mutsuro Ohta, Kanagawa (JP); Takeji Sumiya, Kanagawa (JP)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 0 days.

(21) Appl. No.: 15/053,459

(22) Filed: Feb. 25, 2016

(51) Int. Cl.
  *G11B 33/02* (2006.01)
  *G11B 33/14* (2006.01)
  *G11B 33/12* (2006.01)

(52) U.S. Cl.
  CPC ........ *G11B 33/1446* (2013.01); *G11B 33/022* (2013.01); *G11B 33/027* (2013.01); *G11B 33/122* (2013.01)

(58) Field of Classification Search
  None
  See application file for complete search history.

(56) References Cited

U.S. PATENT DOCUMENTS

| | | | |
|---|---|---|---|
| 5,097,978 A * | 3/1992 | Eckerd | G11B 33/1466 360/132 |
| 5,535,092 A | 7/1996 | Bang | |
| 6,275,353 B1 | 8/2001 | Briggs | |
| 6,399,179 B1 | 6/2002 | Hanrahan et al. | |
| 7,471,509 B1 | 12/2008 | Oliver | |
| 8,339,732 B2 | 12/2012 | Juang et al. | |
| 8,451,559 B1 | 5/2013 | Berding et al. | |
| 8,854,766 B1 | 10/2014 | Gustafson et al. | |
| 2001/0009486 A1* | 7/2001 | Iwahara et al. | G11B 33/08 360/99.19 |
| 2001/0012175 A1 | 8/2001 | Williams et al. | |
| 2003/0179489 A1* | 9/2003 | Bernett et al. | G11B 33/1466 360/97.22 |
| 2005/0068666 A1* | 3/2005 | Albrecht et al. | G11B 33/1466 360/99.18 |
| 2006/0176610 A1* | 8/2006 | Tsuda et al. | G11B 33/1466 360/99.21 |
| 2011/0212281 A1 | 9/2011 | Jacoby et al. | |

* cited by examiner

*Primary Examiner* — Craig A. Renner
(74) *Attorney, Agent, or Firm* — Kunzler Law Group, PC (57) ABSTRACT

Described herein is a hard disk drive that includes a base and a cover. The base includes a closed end, sidewalls, an open end, and one or more corner portions. The sidewalls extend from the closed end, and the open end is defined by the sidewalls. The closed end, sidewalls, and open end define an interior cavity of the hard disk drive. Each corner portion is proximate a respective intersection of the sidewalls and positioned exteriorly of the interior cavity. The cover is welded to the sidewalls over the open end by a weld bead such that the weld bead is positioned between the interior cavity and the corner portions. The weld bead hermetically seals the cover to the base. Furthermore, at least one of the corner portions is at least substantially flush with the cover.

20 Claims, 7 Drawing Sheets

BASE FOR PROTECTING EXTERNAL WELDS OF HERMETICALLY SEALED ELECTRONIC DEVICES

FIELD

This disclosure relates generally to hermetically sealed electronic devices, and more particularly to protecting external welds of hermetically sealed hard disk drives from impact damage.

BACKGROUND

Electronic devices, such as electronic information storage apparatuses, which include hard disk drives, are commonly used for storing and retrieving digital information. For example, hard disk drives utilize rapidly rotating discs or platters coated with magnetic material to store information. The discs and other electrical components essential to operation are contained within a housing of the hard disk drive.

Often, the housings of hard disk drives are hermetically sealed to keep contaminants out of the hard disk drives and to maintain an environment within the housing that promotes performance and reliability of the hard disk drives. For example, the housings of certain hard disk drives are hermetically sealed to retain an inert gas (e.g., helium) within the housings.

Traditionally, a hermetically sealed housing of a hard disk drive includes a base with a cover welded to the base by a weld bead, which provides the seal between the base and the cover. Handling of a hard disk drive may cause damage to the weld bead. For example, as a hard disk drive is installed into a network server, the weld bead may be damaged due to impacts with the network server. Damage to a weld bead may cause gas within the housing to escape from the housing into the environment and allow contaminants to enter the housing.

SUMMARY

The subject matter of the present application has been developed in response to the present state of the art, and in particular, in response to the shortcomings of hermetically sealed electronic devices, that have not yet been fully solved by currently available techniques. Accordingly, the subject matter of the present application has been developed to provide a base, and associated hermetically sealed electronic devices, that overcome at least some of the above-discussed shortcomings of prior art techniques.

According to one embodiment, a hard disk drive includes a base and a cover. The base includes a closed end, sidewalls, an open end, and at least one corner portion. The sidewalls extend from the closed end, and the open end is defined by the sidewalls. The closed end, sidewalls, and open end define an interior cavity of the hard disk drive. At least one corner portion is proximate an intersection of the sidewalls and positioned exteriorly of the interior cavity. The cover is welded to the sidewalls over the open end by a weld bead such that the weld bead is positioned between the interior cavity and the at least one corner portion. The weld bead hermetically seals the cover to the base. Furthermore, the at least one corner portion is at least substantially flush with the cover.

In certain implementations of the hard disk drive, the at least one corner portion includes a surface that is substantially co-planar with the cover.

According to some implementations of the hard disk drive, the base has a substantially rectangular cross-sectional shape taken along a plane parallel to the cover. Moreover, the base includes four corner portions. The at least one corner portion can have a substantially triangular cross-sectional shape taken along a plane parallel to the cover.

In some implementations of the hard disk drive, the weld bead is substantially co-planar with the cover and at least one corner portion.

In yet some implementations of the hard disk drive, the closed end, sidewalls, intersection, and at least one corner portion of the base form a one-piece monolithic construction.

According to one implementation of the hard disk drive, at least one corner portion abuts the weld bead.

In some implementations of the hard disk drive, the base further includes at least one slit interposed between the weld bead and at least one corner portion. At least one corner portion is spaced apart from the weld bead by at least one slit. At least one slit can be angled with respect to the sidewalls.

According to certain implementations of the hard disk drive, the base further includes an electronic interface connection portion coupled to one of the sidewalls. The electronic interface connection portion is positioned exteriorly of the interior cavity such that the weld bead is positioned between the interior cavity and the electronic interface connection portion. Additionally, the electronic interface connection portion is at least substantially flush with the cover. The base may further include a slit interposed between the weld bead and the electronic interface connection portion. The electronic interface connection portion can be spaced apart from the weld bead by the slit.

In some implementations of the hard disk drive, at least one corner portion includes a raised surface at least substantially flush with the cover and further includes a recessed surface recessed relative to the cover. The raised surface is intermediate the recessed surface and the weld bead.

According to yet another embodiment, a base for a hard disk drive is disclosed. The base is configured to be welded to a cover to form a hermetically sealed housing of the hard disk drive. The base includes a closed end, sidewalls, an open end, and at least one corner portion. The sidewalls extend from the closed end. The open end is defined by the sidewalls. Furthermore, the closed end, sidewalls, and open end define an interior cavity of the hard disk drive. At least one corner portion is proximate an intersection of the sidewalls, is positioned exteriorly of the interior cavity such that the intersection of the sidewalls is positioned between the interior cavity and at least one corner portion, and is at least substantially flush with the open end defined by the sidewalls.

According to some implementations of the base, the closed end, sidewalls, and at least one corner portion form a one-piece monolithic construction.

In certain implementations of the base, an entirety of at least one corner portion abuts the intersection of the sidewalls.

In some implementations, the base further includes at least one slit interposed between the intersection of the sidewalls and at least one corner portion. At least one corner portion is spaced apart from the intersection of the sidewalls by at least one slit.

According to certain implementations, the base further includes an electronic interface connection portion coupled to one of the sidewalls. The electronic interface connection portion is positioned exteriorly of the interior cavity such that a portion of the one of the sidewalls of the base is positioned between the interior cavity and the electronic interface connection portion. Additionally, the electronic interface connection portion is at least substantially flush with the open end defined by the sidewalls. The base can further include a slit interposed between the portion of the one of the sidewalls of the base and the electronic interface connection portion. The electronic interface connection portion is spaced apart from the portion of the one of the sidewalls of the base by the slit.

In some implementations of the base, at least one corner portion includes a raised surface at least substantially flush with the open end defined by the sidewalls and a recessed surface recessed relative to the open end defined by the sidewalls. The raised surface is interposed between the recessed surface and the interior cavity.

According to another embodiment, a method of making a hard disk drive includes forming a base, which includes a closed end, an open end, and at least one corner portion. The method also includes positioning a cover onto the open end, to cover the open end, adjacent at least one corner portion such that the cover is at least substantially flush with at least one corner portion. Additionally, the method includes hermetically sealing the cover to the base.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
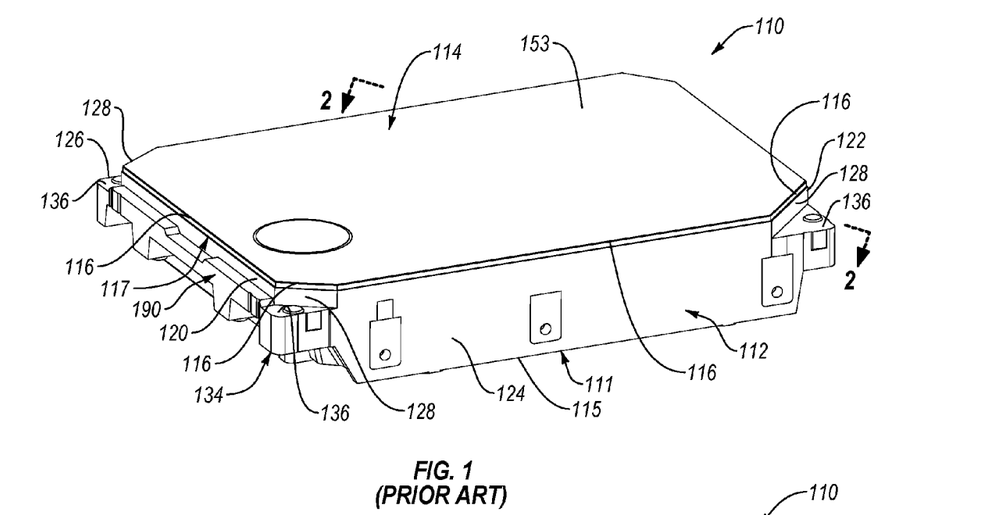
FIG. 1 is a perspective view of a conventional hard disk drive.

Referring to FIG. 1, a conventional hard disk drive (HDD) 110 is shown. The HDD 110 includes a hermetically sealed housing 111 that contains electronic components configured to store and retrieve digital information. The HDD 110 includes a base 112 and a cover 114 coupled to the base 112 to form the hermetically sealed housing 111. The housing 111 is configured to hermetically seal an interior cavity 152 (see, e.g., FIG. 2), defined within the housing, from an exterior environment. According to some implementations, the housing 111 maintains the interior cavity 152 of the housing 111 at a pressure below atmospheric pressure.

The base 112 defines a cavity with a closed end 115 (see, e.g., FIG. 1) and an open end 113 (see, e.g., FIG. 2) that opposes the closed end 115. Generally, the closed end 115 can be a panel. Sidewalls 120, 122, 124, 126 of the base 112 extend transversely from the closed end 115 of the base 112 to circumferentially enclose the base 112 and to, at least partially, define the interior cavity 152. The sidewalls 120, 122 oppose each other to define first and second ends, respectively, of the housing 111. In one implementation, the first end of the housing 111 defined by the sidewall 120 is an electronic interface connection end of the HDD 110. Generally, the electronic interface connection end of the HDD 110 an electronic interface connection portion 190 coupled to and extending from the sidewall 120. The electronic interface connection portion 190 is configured to securely receive electronic interface components that interface with corresponding electronic interface components of a computing device (not shown) to facilitate the transmission of data and power signals between the HDD 110 and the computing device. Accordingly, the electronic interface connection portion 190 of the base 112 may include structure to which the electronic interface components of the HDD 110 are non-releasably fixed and to which the electronic interface components of the computing device are releasably fixed. The sidewalls 124, 126 oppose each other to define first and second sides, respectively, of the housing 111.

In the illustrated embodiment, the base 112 includes four sidewalls. As shown, in certain implementations, the sidewalls 120, 122 are parallel to each other, the sidewalls 124, 126 are parallel to each other, and the sidewalls 120, 122 are perpendicular to the sidewalls 124, 126 such that a cross-section of the base 112, taken along a plane parallel to the cover 114, has a substantially square or rectangular shape. However, in other implementations, the sidewalls 120, 122, 124, 126 may have any of various configurations, and the base 112 may have more or fewer than four sidewalls, such that a cross-section of the base 112, taken along a plane parallel to the cover 114 has any of various shapes other than substantially square or rectangular.

Figure 2:
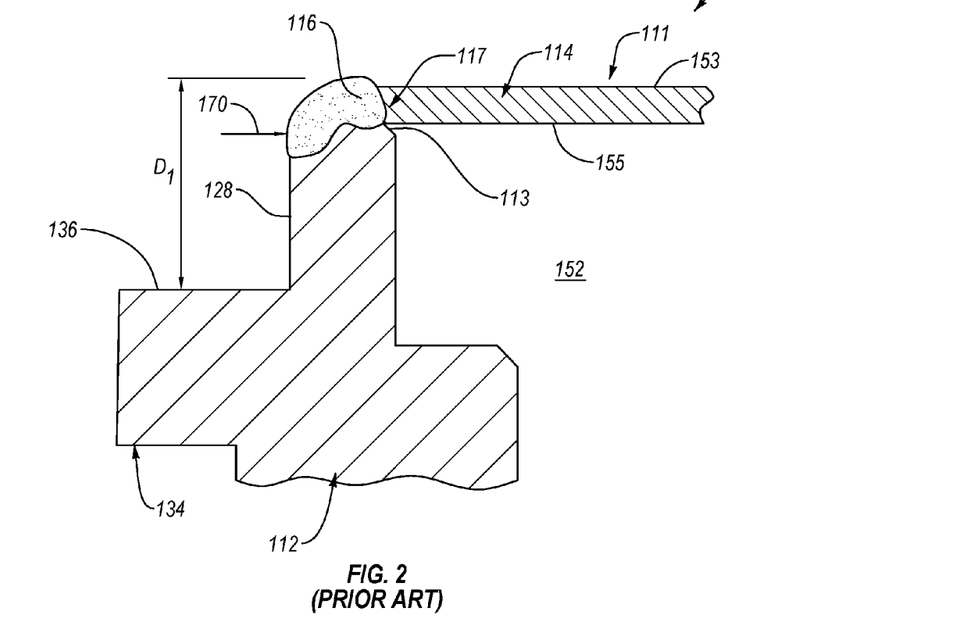
FIG. 2 is a cross-sectional side elevation view of a corner portion of the hard disk drive of FIG. 1, taken along the line 2-2 of FIG. 1.

The sidewalls 120, 122 are coupled to the sidewalls 124, 126 via respective intersections 128 of the sidewalls. More specifically, the sidewall 124 is coupled to the sidewall 120 via a single intersection 128 that extends between and is coupled to the sidewalls 120, 124. Similarly, the sidewall 124 is coupled to the sidewall 122 via a single intersection 128 that extends between and is coupled to the sidewalls 122, 124. In the same manner, the sidewall 126 is coupled to the sidewall 120 and the sidewall 122 via respective single intersections 128. Because an intersection 128 effectively joins together two adjacent sidewalls, an intersection 128 is defined as an intersection of the two adjacent sidewalls. Generally, an intersection 128 can be considered a diagonal sidewall of the base 112 interposed between two sidewalls extending transversely relative to each other. In other words, an intersection 128 is diagonal or angled relative to the sidewalls to which it is joined. According to certain implementations, each intersection 128 is angled to define the same angle (e.g., 45-degrees) with both sidewalls to which it is joined. However, in some implementations, an intersection 128 is angled to define different angles (e.g., 30-degrees and 60-degrees) with the sidewalls to which it is joined. Referring to FIG. 2, the open end 113 of the base 112 is defined by upper end surfaces of the sidewalls 120, 122, 124, 126 and intersections 128.

The base 112 further includes one or more corner portions 134 each coupled to and extending from a respective one of the intersections 128 to effectively define the corners of the base 112. In the illustrated embodiment, the base 112 includes four corner portions 134. The corner portions 134 are positioned exteriorly of the interior cavity 152 of the HDD 110. In other words, the corner portions 134 extend from the respective intersections 128 outwardly away from the interior cavity 152 of the HDD 110 such that an intersection 128 is interposed between a respective corner portion 134 and the interior cavity 152. As the corner portions 134 define corners of the base 112 and extend from diagonal sidewalls, in some implementations, a corner portion 134 has a substantially triangular cross-sectional shape taken along a plane parallel to the cover 114. A corner portion 134 includes an uppermost surface 136 or uppermost point nearest the open end 113 of the base 112.

The base 112 can be made from any of various materials. However, in one implementation, the base 112 is made from a metal, such as aluminum or stainless steel, configured to resist impacts to the HDD 110 and be conducive to welding the cover 114 thereto. In some implementations, the base 112 is machined from a single unformed billet of material or from a formed (e.g., molded, stamped, etc.) piece of material. Alternatively, the base 112 can be molded or stamped, without machining. According to some embodiments, the base 112 forms a one-piece monolithic construction. In other words, the portions of the base 112, such as the closed end 115, sidewalls 120-126, intersections 128, and corner portions 134 are co-formed to have a one-piece monolithic construction made from the same homogenous material.

The cover 114, which includes a top surface 153 and a bottom surface 155 opposing the top surface, is positioned over the open end 113 and onto the upper end surfaces of the sidewalls 120, 122, 124, 126 and intersections 128 of the base 112 to effectively close the open end 113 and form the interior cavity 152 of the HDD 110 between the base 112 and the cover 114. Welding the cover 114 to the base 112 facilitates the hermetic sealing of the interior cavity 152. In other words, an external or exposed weld bead 116 is formed around an entire periphery of the housing 111 at an external interface 117 between the base 112 and the cover 114 to form a seal between the base 112 and the cover 114. The weld bead 116 can be formed using any of various welding techniques in the art to at least partially fuse together the base 112 and the cover 114 by concurrently melting the base 112 and the cover 114 via application of intense heat to the base 112 and the cover 114. For example, the weld bead 116 can be made from a melted and then cooled combination of the materials of the base 112 and the cover 114. In other words, the weld bead 116 is at least partially formed into the cover 114 or the cover 114 at least partially becomes the weld bead 116. Accordingly, the weld bead 116 defines a non-reversible or permanent joint between the base 112 and the cover 114. In certain implementations, a filler material can be added to the melted combination of the materials of the base 112 and the cover 114, via the application of heat, to produce the weld bead 116. The solid and relatively non-porous nature of the weld bead 116 prevents the passage of contaminants and gas through the interface between the base 112 and the cover 114, thus hermetically sealing the housing 111.

Generally, the cover 114 is sized and shaped to complement or match the size and shape of the upper end surfaces of the sidewalls 120, 122, 124, 126 and intersections 128 of the base 112 such that the cover 114 does not undershoot or overhang the sidewalls 120, 122, 124, 126 or intersections 128 of the base. Accordingly, in the illustrated embodiment, the cover 114 has a generally square or rectangular shape with diagonal corners. The weld bead 116 extends along, and defines, the edges and corners of the housing 111 on a first side (e.g., top side) of the housing 111. In some implementations, the weld bead 116 is substantially flush with an exterior of the housing 111 (e.g., exterior surfaces of the cover 114 and the base 112). The weld bead 116 may define substantially rounded edges and corners of the housing 111. Alternatively, the weld bead 116 may define substantially sharp edges and corners of the housing 111.

As shown in FIG. 2, the entirety of the corner portions 134 of the conventional HDD 110 are offset or recessed from the open end 113 of the base 112 and the cover 114 by a distance $D_1$. In other words, the uppermost surface 136 or uppermost point of a corner portion 134 is spaced away from (e.g., below) the open end 113 and cover 114 by the distance $D_1$. Accordingly, no part of the corner portions 134 of the conventional HDD 110 is laterally adjacent (e.g., in a direction parallel to the direction 170) the weld bead 116.

The base 112 and cover 114 of the housing 111 can be made from any of various rigid materials (e.g., metals and metal alloys). In some implementations, the base 112 and cover 114 are made from the same materials. However, in other implementations, the base 112 and cover 114 are made from different materials.

Generally, the housing 111 of the HDD 110 sealingly contains and protects, within the interior cavity 152, various internal components configured to store and retrieve data and information, as well as to control the storage and retrieval of data and information. According to one embodiment, the internal components are sensitive to contaminants and pressure changes. Therefore, hermetically sealing the internal components from the exterior environment promotes the proper operation of the HDD 110 and the extension of the life of the HDD 110. Although not shown, the components sealed within the interior cavity 152 of the housing 111 may include magnetic recording media (e.g., hard disks), transducer heads, armatures, spindles, servo motors, electrical circuitry, and the like. Generally, the HDD 110 includes a spindle that is operably connected to the base 112 via a spindle motor coupled to the base 112. The spindle is co-rotatably coupled to the spindle motor such that the spindle motor rotatably drives the spindle. The disks are operably connected to the spindle via respective hubs fixedly secured to respective disks and co-rotatably coupled to the spindle. As the spindle rotates, the disks correspondingly rotate. Accordingly, the spindle motor can be operatively controlled to rotate the disks a controlled amount and at a controlled rate. As the disks rotate, a servo motor positions the armatures and the transducer heads connected to each armature, such that the heads are positioned over a specified radial area of the disks for read or write operations.

The HDD 110 can be in electrical communication with a computing device (not shown) to store and transfer data associated with operation of the computing device. Further, the HDD 110 can be physically installed into or coupled to the computing device. Often, the HDD 110 is installed into the computing device (e.g., a network server) by inserting the HDD 110 into the computing device in a direction corresponding with the direction 170 (see, e.g., FIG. 2). In some instances, as the HDD 110 is moving in the direction corresponding with the direction 170, the HDD 110 may impact various objects, such as internal walls of the computing device, which impart an impact force to the HDD 110 in the same direction. For example, the HDD 110 may be over-inserted into the computing device or inserted into the computing device with excessive force such that the HDD 110 unintentionally impacts a portion of the computing device. In addition to the installation of the HDD 110 into a computing device, general handling of the HDD 110 prior to, during, or after installation may result in objects impacting the HDD 110 to impart impact forces to the HDD 110 in the direction corresponding with directional arrows 170.

The impacts to the HDD 110, particularly the weld bead 116, may damage the weld bead 116 such that the hermetic seal provided by the weld bead 116 is broken. A broken seal resulting from a damaged weld bead 116 may allow the gas within the interior cavity 152 of the housing 111 to leak from the housing 111 and/or allow contaminants to enter the interior cavity 152 of the housing 111.

To reduce damage to the weld bead, caused by impacts to the weld bead in the direction 170, the weld bead can be protected or shielded by modifying (e.g., raising or extending) a corner portion so that the uppermost surface or uppermost point of the corner portion is at least substantially flush with the cover (see, e.g., FIGS. 3-11). As defined herein, the uppermost surface of a corner portion is at least substantially flush with the cover when the uppermost surface is laterally level or even, in the direction 170, with any portion of the cover or extends higher than the cover in the direction 180 (see, e.g., FIG. 4). For example, according to one implementation, the uppermost surface of a corner portion is at least substantially flush with the cover when the uppermost surface is substantially co-planar with the cover or with a plane above and parallel with the cover. Further, because the weld bead is formed into the cover, when the uppermost surface of a corner portion is at least substantially flush with the cover, the uppermost surface of the corner portion also is at least substantially flush with the weld bead. With a corner portion at least substantially flush with a cover and weld bead of an HDD, impacts that normally would impact a weld bead would be received by the corner portion instead of the weld bead.

Referring to FIGS. 3-11, various embodiments of an HDD are shown. The embodiments of the HDD shown in FIGS. 3-11 include features similar to the features of the HDD 110 of FIGS. 1 and 2, with like numbers referring to like features. Generally, two numbers differing only by the number's series are like numbers, such that, for example, 1xx is a like number with 2xx, where xx is the same number. Unless otherwise noted, the above descriptions of the features of the HDD 110 of FIGS. 1 and 2 apply to the like features of the HDD of the embodiments of FIGS. 3-11.

Figure 3:
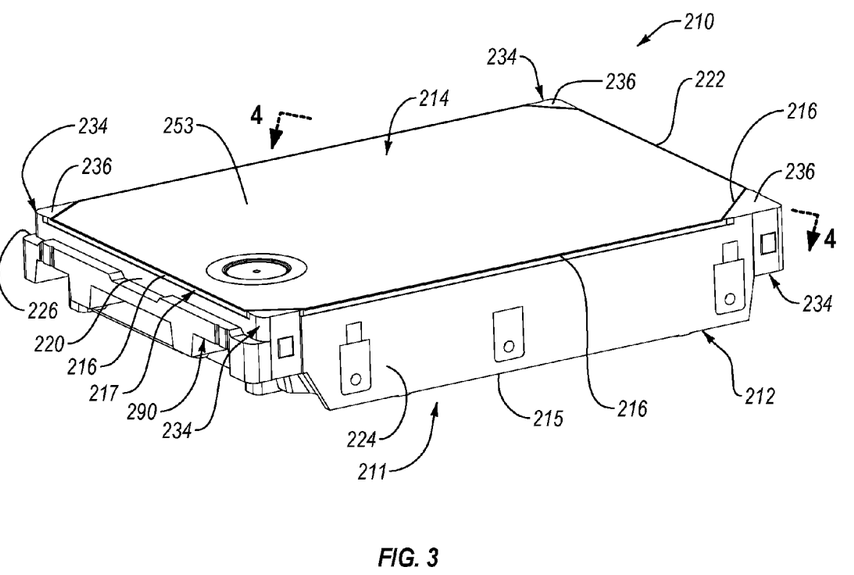
FIG. 3 is a perspective view of a hard disk drive, according to one or more embodiments of the present disclosure.
Figure 4:
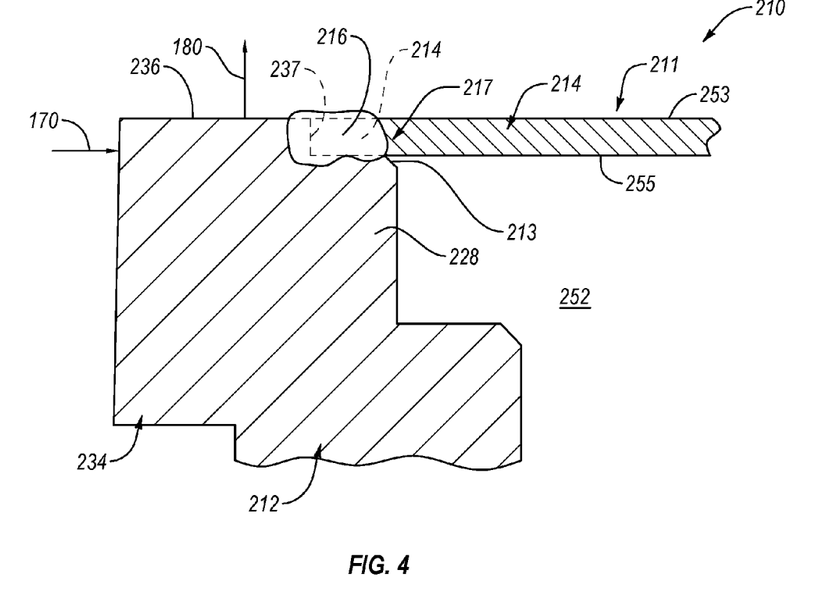
FIG. 4 is a cross-sectional side elevation view of a corner portion of the hard disk drive of FIG. 3, taken along the line 4-4 of FIG. 3, according to one or more embodiments of the present disclosure.

As shown in FIGS. 3 and 4, the base 212 of the HDD 210 includes a corner portion 234 with an uppermost surface 236 that is at least substantially flush with the cover 214 and weld bead 216 of the HDD 210. A corner portion 234 laterally abuts or contacts the weld bead 216. In some implementations, a part of a corner portion 234 is at least partially formed into the weld bead 216 or the weld bead 216 is at least partially formed into a corner portion 234. For example, as shown in dashed lines, prior to forming the weld bead 216, the cover 214 may abut or be positioned very close to an interiorly facing surface 237 of a corner portion 234. The weld bead 216 is then formed by melting together parts of the cover 214, intersection 228, and corner portion 234. In other implementations, a corner portion 234 abuts, but does not form a part of, the weld bead 216. Although the uppermost surface 236 of the corner portion 234 shown in FIG. 4 is co-planar with a top surface 253 of the cover 214, in other embodiments, the uppermost surface 236 of the corner portion 234 is co-planar with a bottom surface 255 of the cover 214, co-planar with a plane between the top and bottom surfaces 253, 255 of the cover 214, or co-planar with a plane above the top surface 253 of the cover 214.

Figure 5:
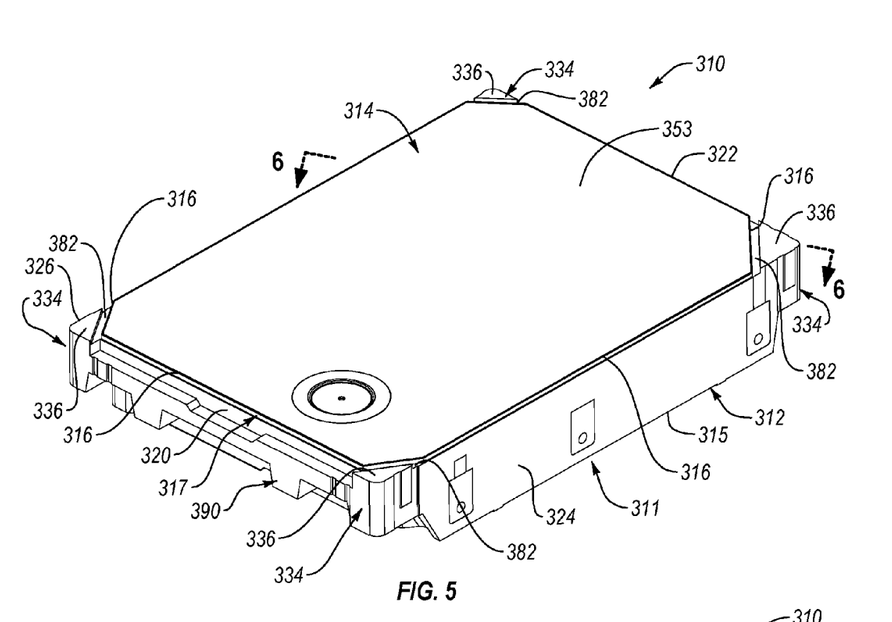
FIG. 5 is a perspective view of a hard disk drive, according to one or more embodiments of the present disclosure.
Figure 6:
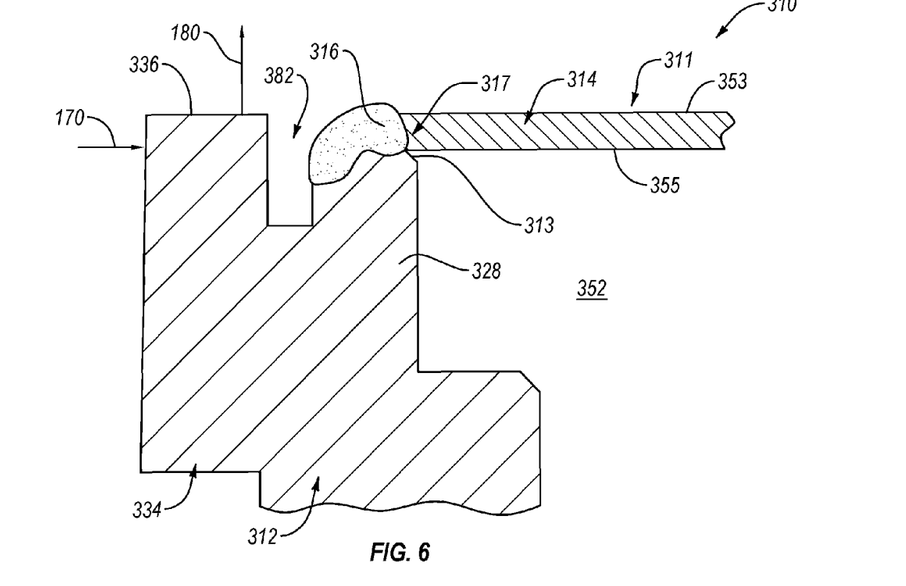
FIG. 6 is a cross-sectional side elevation view of a corner portion of the hard disk drive of FIG. 5, taken along the line 6-6 of FIG. 5, according to one or more embodiments of the present disclosure.

Referring to FIGS. 5 and 6, the base 312 of the HDD 310 includes a slit 382 interposed (e.g., laterally along direction 170) between an intersection 328 and a corner portion 334. A slit 382 may extend along a respective intersection 328 to define an angle with the corresponding sidewalls equal to the angle defined between the intersection 328 and the sidewalls. In some implementations, the slit 382 extends into the base 312 at least as deep as the weld bead 316.

The slit 382 provides a gap between the corner portion 334 and the intersection 328, while still allowing the uppermost surface 336 of the corner portion 334 to be at least substantially flush with the cover 314. The gap defined by the slit 382 promotes access to the cover 314 while on the intersection 328 for forming the weld bead 316 and avoids interference with the corner portion 334 while forming the weld bead 316. In other words, because of the slit 382 separating the corner portion 334 from the intersection 328, the corner portion 334 does not form part of the weld bead 316. Additionally, the gap defined by the slit 382 helps promote the structural integrity of the weld bead 316 by providing a space for gas, produced as a byproduct of the welding process, to escape during the formation of the weld bead 316. After the weld bead 316 is formed, in some implementations, as shown, a slit 382 also is interposed between the weld bead 316 and a corner portion 334 such that a gap exists between the weld bead 316 and a corner portion 334. Although the uppermost surface 336 of the corner portion 334 shown in FIG. 6 is co-planar with a top surface 353 of the cover 314, in other embodiments, the uppermost surface 336 of the corner portion 334 is co-planar with a bottom surface 355 of the cover 314, co-planar with a plane between the top and bottom surfaces 353, 355 of the cover 314, or co-planar with a plane above the top surface 353 of the cover 314.

Figure 7:
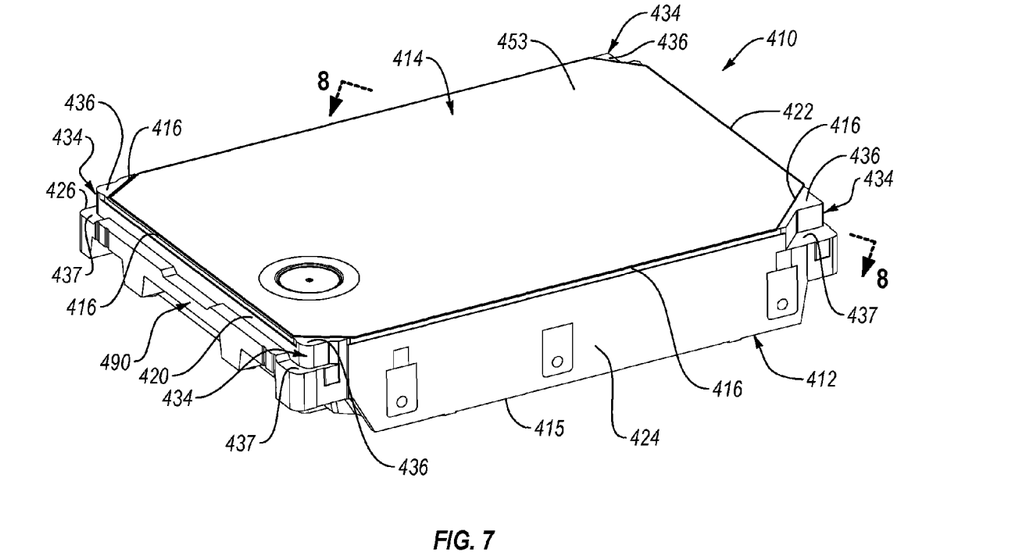
FIG. 7 is a perspective view of a hard disk drive, according to one or more embodiments of the present disclosure.
Figure 8:
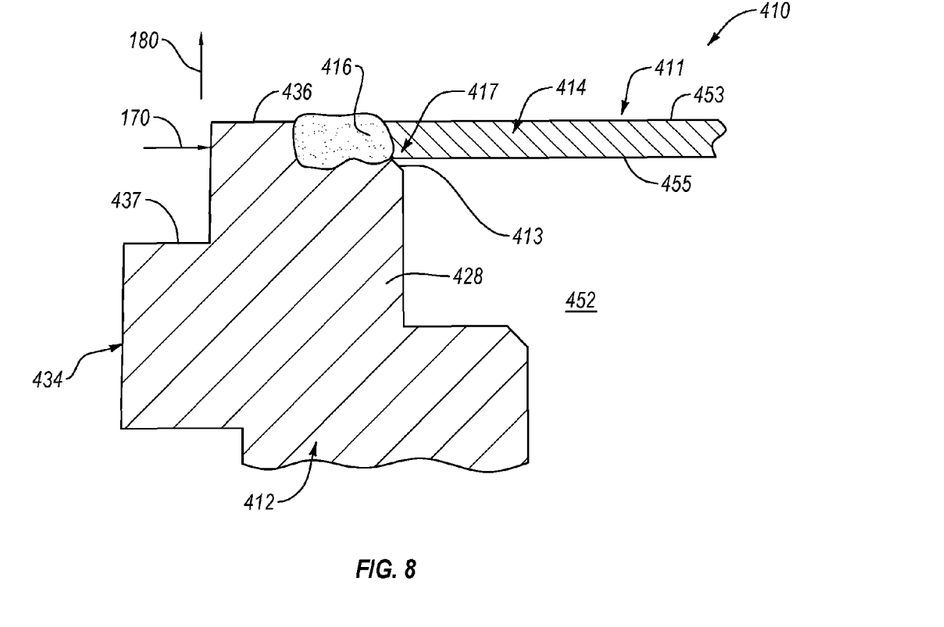
FIG. 8 is a cross-sectional side elevation view of a corner portion of the hard disk drive of FIG. 7, taken along the line 8-8 of FIG. 7, according to one or more embodiments of the present disclosure.

Referring to FIGS. 7 and 8, the base 412 of the HDD 410 includes a corner portion 434 with an uppermost surface 436 (e.g., raised surface) and a recessed surface 437. Generally, the uppermost surface 436 is at least substantially flush with the cover 414, and the recessed surface 437 is recessed relative to, lower than, or offset from the uppermost surface 436. Moreover, the recessed surface 437 is positioned exteriorly of the uppermost surface 436 such that the uppermost surface 436 is intermediate the recessed surface 437 and the weld bead 416. In some implementations, such as shown, the corner portion 434 laterally abuts or contacts the weld bead 416, such as with the corner portions 234 of the base 212 of FIGS. 3 and 4. However, in other implementations, the base 412 can include slits, such as slits 382 (see, e.g., FIGS. 5 and 6), that provide a lateral gap between the corner portions 434 and the intersections 428 and thus a lateral gap between the corner portions 434 and the weld bead 416. Although the uppermost surface 436 of the corner portion 434 shown in FIG. 8 is co-planar with a top surface 453 of the cover 414, in other embodiments, the uppermost surface 436 of the corner portion 434 is co-planar with a bottom surface 455 of the cover 414, co-planar with a plane between the top and bottom surfaces 453, 455 of the cover 414, or co-planar with a plane above the top surface 453 of the cover 414.

With the recessed surface 437 being exteriorly positioned relative to the uppermost surface 436, the recessed surface 437 is accessible as an attachment surface, for the attachment of external components, without obstruction from the uppermost surface 436. According to some implementations, the attachment surface is clamped by clamping means to hold the base 412 in place while the base 412 is constructed and/or while the HDD 410 is assembled. In other words, a corner portion 434 of the base 412 not only protects the weld bead 416 from impacts, but also provides an attachment surface for clamping during manufacturing of the HDD 410.

Figure 9:
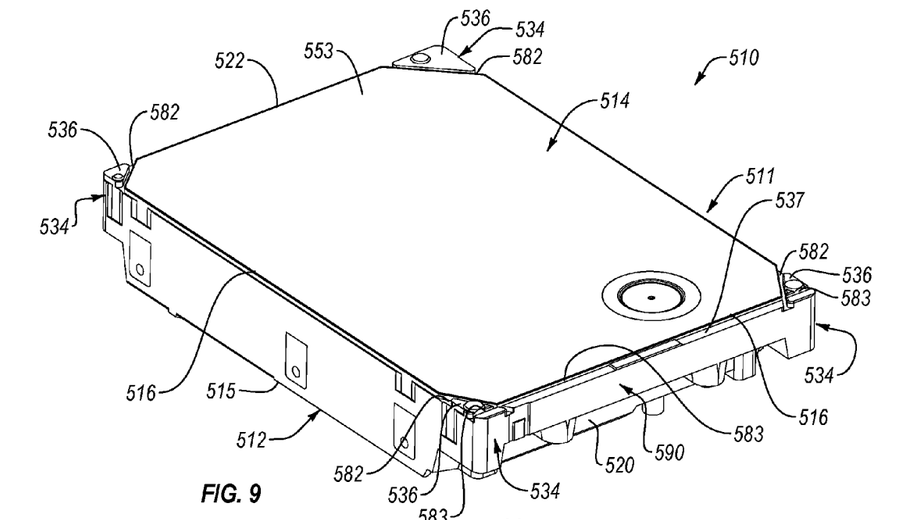
FIG. 9 is a perspective view of a hard disk drive, according to one or more embodiments of the present disclosure.
Figure 10:
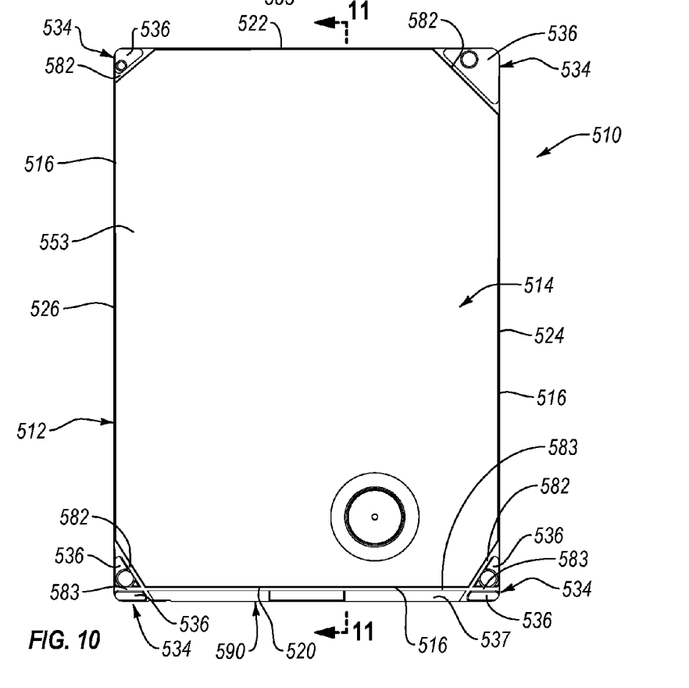
FIG. 10 is a top plan view of the hard disk drive of FIG. 9, according to one or more embodiments of the present disclosure.
Figure 11:
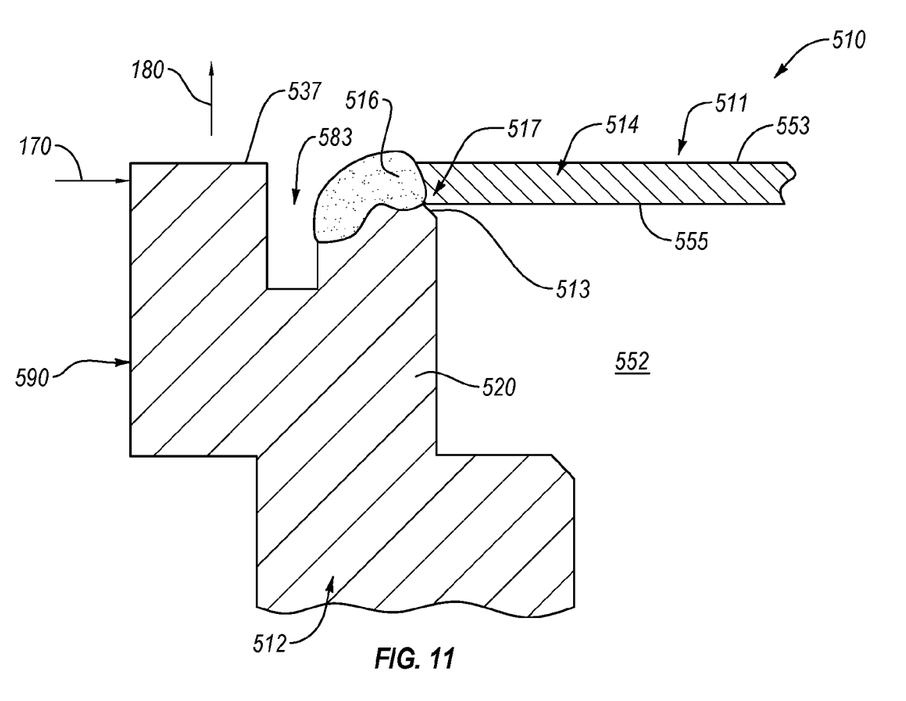
FIG. 11 is a cross-sectional side elevation view of a corner portion of the hard disk drive of FIG. 10, taken along the line 11-11 of FIG. 10, according to one or more embodiments of the present disclosure.

Referring to FIGS. 9-11, the base 512 of the HDD 510 includes a sidewall 520 and an electronic interface connection portion 590. The electronic interface connection portion 590 is coupled and extends from the sidewall 520. In some implementations, the electronic interface connection portion 590 extends along a majority (e.g., an entirety) of the length of the sidewall 520. Furthermore, the electronic interface connection portion 590 is positioned exteriorly of the interior cavity 552 of the HDD 510 such that the electronic interface connection portion 590 extends from the sidewall 520 outwardly away from the interior cavity 552, and the sidewall 520 is interposed between the electronic interface connection portion 590 and the interior cavity 552. The electronic interface connection portion 590 includes an uppermost surface 537 that is at least substantially flush with the cover 514 and weld bead 516 of the HDD 510. Additionally, the base 512 of the HDD 510 includes a slit 583 interposed (e.g., laterally along direction 170) between the sidewall 520 and the electronic interface connection portion 590. In some implementations, the slit 583 extends into the base 512 at least as deep as the weld bead 516. In some implementations, the slit 583 extends along an entirety of the electronic interface connection portion 590. For example, in one implementation, as shown, the slit 583 extends between, inclusively, the sidewalls 524, 526. In other words, the slit 583 may be formed, at least partially, in the sidewalls 524, 526.

The slit 583 provides a gap between the electronic interface connection portion 590 and the sidewall 520, while still allowing the uppermost surface 537 of the electronic interface connection portion 590 to be at least substantially flush with the cover 514. The gap defined by the slit 583 promotes access to the cover 514 while on the sidewall 520 for forming the weld bead 516 and avoids interference with the electronic interface connection portion 590 while forming the weld bead 516. In other words, because of the slit 583 separating the electronic interface connection portion 590 from the sidewall 520, the electronic interface connection portion 590 does not form part of the weld bead 516. Additionally, the gap defined by the slit 583 helps promote the structural integrity of the weld bead 516 by providing a space for gas, produced as a byproduct of the welding process, to escape during the formation of the weld bead 516. After the weld bead 516 is formed, in some implementations, as shown, the slit 583 also is interposed between a weld bead 516 and the electronic interface connection portion 590 such that a gap exists between the weld bead 516 and the electronic interface connection portion 590.

Although the uppermost surface 537 of the electronic interface connection portion 590 shown in FIG. 11 is co-planar with a top surface 553 of the cover 514, in other embodiments, the uppermost surface 537 of the electronic interface connection portion 590 is co-planar with a bottom surface 555 of the cover 514, co-planar with a plane between the top and bottom surfaces 553, 555 of the cover 514, or co-planar with a plane above the top surface 553 of the cover 514.

Additionally, in some embodiments, as shown in FIGS. 9 and 10, the base 512 of the HDD 510 includes a corner portion 534 with an uppermost surface 536 that is at least substantially flush with the cover 514 and weld bead 516 of the HDD 510. Like the HDD 310 of FIGS. 5 and 6, the HDD 510 has a slit 582 interposed between an intersection 528 and a corner portion 534. A slit 582 may extend along a respective intersection 528 to define an angle with the corresponding sidewalls equal to the angle defined between the intersection 528 and the sidewalls. In some implementations, the slits 582 extend into the base 512 at least as deep as the weld bead 516. Furthermore, as shown, the slit 583 may intersect or pass through the two slits 582 nearest the electronic interface connection portion 590. Additionally, as shown, the two slits 582 nearest the electronic interface connection portion 590 may extend into, or be formed at least partially in, the electronic interface connection portion 590.

In the illustrated embodiments, the base of the HDD has four corner portions. However, in other embodiments, the base of an HDD of the present disclosure can have fewer or more than four corner portions. Moreover, although each of the corner portions of a given base of many of the illustrated embodiments have the same general shape (e.g., triangular) and size, in other embodiments, the corner portions of the same base can have different shapes and/or sizes. For example, as shown in FIG. 10, an upper-right corner portion 534 of the base 512 is larger than the upper-left corner portion 534. Additionally, although each of the corner portions of a given base of the illustrated embodiments have the same height relative to the cover coupled to the base, in other embodiments, the corner portions of the same base can have different heights relative to the cover.

Although an HDD is depicted in FIGS. 3-11, in other embodiments, the features of the present disclosure can be employed with any of various other magnetic data storage systems, non-magnetic data storage system, or other electronic devices having a hermetically sealed housing that contains electronic components without departing from the essence of the present disclosure. Furthermore, although in the above-described embodiments, a cover is sealed to a base with a weld bead, formed using a welding technique, and features are provided to protect the weld bead from impact damage, in other embodiments, the cover can be sealed to the base with other types of seals formed using any of various techniques and the features can be provided to protect the other types of seals.

Figure 12:
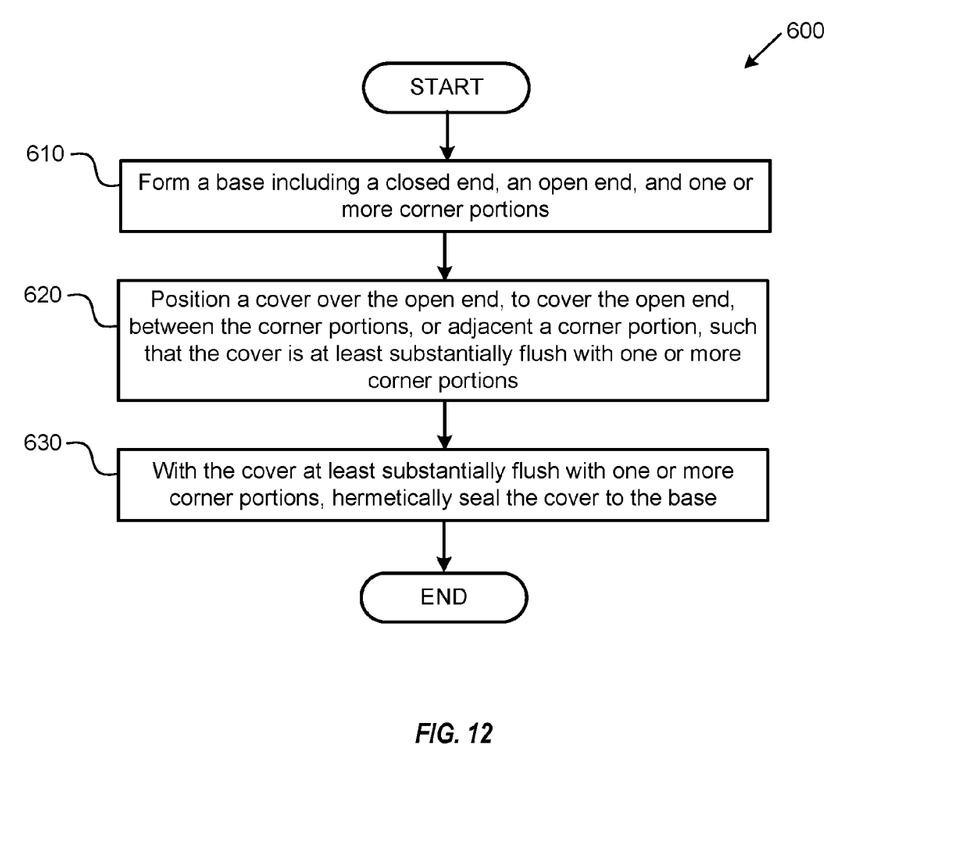
FIG. 12 is a schematic flow diagram of a method of making a hard disk drive, according to one or more embodiments of the present disclosure.

Referring to FIG. 12, a method 600 of making a hard disk drive is shown. The method 600 includes forming a base, which includes a closed end, an open end, and one or more corner portions, at 610. Additionally, the method 600 includes positioning a cover over the open end, to cover the open end, between the corner portions, or adjacent a corner portion, such that the cover is at least substantially flush with one or more corner portions at 620. Positioning the cover over the open end can include positioning the cover onto uppermost surfaces of sidewalls of the base to define an enclosed interior cavity of the hard disk drive. The method 600 further includes, with the cover at least substantially flush with one or more corner portions, hermetically sealing the cover to the base at 630.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A base for a hard disk drive, the base being configured to be welded to a cover to form a hermetically sealed housing of the hard disk drive, the base comprising:
   a closed end;
   an open end, opposite the closed end;
   sidewalls extending from the closed end to the open end, wherein each of the sidewalls comprises a sidewall uppermost surface at the open end;
   intersections joining adjacent sidewalls, angled with respect to the sidewalls, and each comprising an intersection uppermost surface flush with the sidewall uppermost surfaces of the sidewalls, wherein the closed end, sidewalls, and open end define an interior cavity of the hard disk drive; and corner portions each adjacent a respective one of the intersections of the sidewalls and positioned exteriorly of the interior cavity, such that each intersection of the sidewalls is positioned between the interior cavity and each respective corner portion, wherein each of the corner portions comprises a corner uppermost surface elevated above the sidewall uppermost surfaces of the sidewalls and the intersection uppermost surfaces of the intersections.

2. The base according to claim 1, wherein the closed end, sidewalls, and corner portions form a one-piece monolithic construction.

3. The base according to claim 1, wherein an entirety of the corner portions abut the intersections of the sidewalls.

4. The base according to claim 1, wherein:
the base further comprises at least one slit interposed between each intersection of the sidewalls and each respective corner portion; and
each corner portion is spaced apart from each respective intersection of the sidewalls by the at least one slit.

5. The base according to claim 1, further comprising an electronic interface connection portion coupled to one of the sidewalls, wherein:
the electronic interface connection portion is positioned exteriorly of the interior cavity such that a portion of the one of the sidewalls of the base is positioned between the interior cavity and the electronic interface connection portion; and
the electronic interface connection portion is at least substantially flush with the open end defined by the sidewalls.

6. The base according to claim 5, wherein:
the base further comprises a slit interposed between the portion of the one of the sidewalls of the base and the electronic interface connection portion; and
the electronic interface connection portion is spaced apart from the portion of the one of the sidewalls of the base by the slit.

7. The base according to claim 1, wherein:
at least one of the corner portions comprises a raised surface at least substantially flush with the open end defined by the sidewalls and a recessed surface recessed relative to the open end defined by the sidewalls; and
the raised surface is interposed between the recessed surface and the interior cavity.

8. A hard disk drive, comprising:
a base, comprising:
a closed end;
an open end, opposite the closed end;
sidewalls extending from the closed end to the open end, wherein each of the sidewalls comprises a sidewall uppermost surface at the open end;
intersections joining adjacent sidewalls, angled with respect to the sidewalls, and each comprising an intersection uppermost surface flush with the sidewall uppermost surfaces of the sidewalls, wherein the closed end, sidewalls, and open end define an interior cavity of the hard disk drive;
corner portions each adjacent a respective one of the intersections of the sidewalls and positioned exteriorly of the interior cavity, wherein each of the corner portions comprises a corner uppermost surface elevated above the sidewall uppermost surfaces of the sidewalls and the intersection uppermost surfaces of the intersections; and
a cover, welded to the sidewalls over the open end by a weld bead such that the weld bead is positioned between the interior cavity and the at least one corner portions, wherein the weld bead hermetically seals the cover to the base;
wherein the corner uppermost surface of the corner portions is at least substantially flush with an exteriorly facing surface of the cover.

9. The hard disk drive according to claim 8, wherein the corner uppermost surface of each corner portion is substantially co-planar with the exteriorly facing surface of the cover.

10. The hard disk drive according to claim 8, wherein:
the base has a substantially rectangular cross-sectional shape taken along a plane parallel to the cover; and
the base comprises four corner portions.

11. The hard disk drive according to claim 8, wherein the corner portions have a substantially triangular cross-sectional shape taken along a plane parallel to the cover.

12. The hard disk drive according to claim 8, wherein the weld bead is substantially co-planar with the cover and the corner portions.

13. The hard disk drive according to claim 8, wherein the closed end, sidewalls, intersections, and the corner portions of the base form a one-piece monolithic construction.

14. The hard disk drive according to claim 8, wherein the corner portions abut the weld bead.

15. The hard disk drive according to claim 8, wherein:
the base further comprises at least one slit interposed between the weld bead and at least one of the corner portions; and
the at least one corner portion is spaced apart from the weld bead by the at least one slit.

16. The hard disk drive according to claim 15, wherein the at least one slit is angled with respect to the sidewalls.

17. The hard disk drive according to claim 8, wherein:
the base further comprises an electronic interface connection portion coupled to one of the sidewalls;
the electronic interface connection portion is positioned exteriorly of the interior cavity such that the weld bead is positioned between the interior cavity and the electronic interface connection portion; and
the electronic interface connection portion is at least substantially flush with the cover.

18. The hard disk drive according to claim 17, wherein:
the base further comprises a slit interposed between the weld bead and the electronic interface connection portion; and
the electronic interface connection portion is spaced apart from the weld bead by the slit.

19. The hard disk drive according to claim 8, wherein:
at least one of the corner portions comprises a raised surface at least substantially flush with the cover and further comprises a recessed surface recessed relative to the cover; and
the raised surface is intermediate the recessed surface and the weld bead.

20. A method of making a hard disk drive, the method comprising:
forming a base, comprising a closed end, an open end, sidewalls extending from the closed end to the open end, intersections joining adjacent sidewalls, the intersections angled with respect to the sidewalls, and corner portions, wherein each of the sidewalls comprises a sidewall uppermost surface at the open end, wherein each of the corner portions comprises a corner uppermost surface elevated above the sidewall uppermost surfaces of the sidewalls and intersection uppermost surfaces of the intersections;

positioning a cover onto the open end, to cover the open end, adjacent the corner portions such that an exteriorly facing surface of the cover is at least substantially flush with the corner uppermost surface of the corner portions; and hermetically sealing the cover to the base.

* * * * *